United States Patent
Kobayashi et al.

(10) Patent No.: US 11,479,184 B2
(45) Date of Patent: Oct. 25, 2022

(54) SOUND COLLECTION APPARATUS (71) Applicant: NIPPON TELEGRAPH AND TELEPHONE CORPORATION, Tokyo (JP)

(72) Inventors: Kazunori Kobayashi, Tokyo (JP); Shoichiro Saito, Tokyo (JP); Masahiro Fukui, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/263,867

(22) PCT Filed: Jul. 10, 2019

(86) PCT No.: PCT/JP2019/027247
§ 371 (c)(1),
(2) Date: Jan. 27, 2021

(87) PCT Pub. No.: WO2020/026727
PCT Pub. Date: Feb. 6, 2020

(65) Prior Publication Data
US 2021/0229604 A1  Jul. 29, 2021

(30) Foreign Application Priority Data

Aug. 2, 2018 (JP) .............................. JP2018-145954

(51) Int. Cl.
*B60R 11/02* (2006.01)
*H04R 1/40* (2006.01)
*H04R 3/00* (2006.01)

(52) U.S. Cl.
CPC ............ *B60R 11/0247* (2013.01); *H04R 1/40* (2013.01); *H04R 3/002* (2013.01)

(58) Field of Classification Search
CPC ........ B60R 11/0247; H04R 1/40; H04R 3/002
(Continued)

(56) References Cited

U.S. PATENT DOCUMENTS

| 2004/0185804 A1 | 9/2004 | Kanamori et al. |
| 2014/0098968 A1* | 4/2014 | Furuta ................... G10K 11/16 381/71.12 |

FOREIGN PATENT DOCUMENTS

| JP | 2004-187283 A | 7/2004 |
| JP | 2008-079256 A | 4/2008 |

(Continued)

OTHER PUBLICATIONS

"Development of sound collection technique that allows for comfortable audio operations and communications inside a car—Realization of low-delay, high-quality audio processing desired in the connected car era—", [online], 2018, Nippon Telegraph and Telephone Corporation, May 24, 2018, Internet URL:http://www.ntt.co.jp/news2018/1802/pdf/180219c.pdf, with translation generated by machine.

*Primary Examiner* — Paul Kim
*Assistant Examiner* — Douglas J Suthers (57) ABSTRACT

An object is to provide a sound collection apparatus capable of collecting a sound with a higher SN rate than before through use of a reflected sound. The sound collection apparatus is installed in a vehicle. The vehicle includes a seat for a passenger to sit on, and a reflective structure that reflects a sound emitted by a passenger sitting in the seat. The sound collection apparatus includes a first microphone arranged at a position where a direct sound that is a sound emitted by the passenger is readily collected, and a second microphone arranged at a position where a reflected sound that is a sound emitted by the passenger and reflected by the reflective structure is readily collected.

4 Claims, 11 Drawing Sheets

(58) Field of Classification Search
USPC .......................................................... 381/86
See application file for complete search history.

(56) References Cited

FOREIGN PATENT DOCUMENTS

| | | | |
|---|---|---|---|
| JP | 2010221945 | A | 10/2010 |
| WO | 2013/065088 | A1 | 5/2013 |

* cited by examiner

Fig. 11

SOUND COLLECTION APPARATUS

CROSS-REFERENCE TO RELATED APPLICATIONS

This application is a U.S. 371 Application of International Patent Application No. PCT/JP2019/027247, filed on 10 Jul. 2019, which application claims priority to and the benefit of JP Application No. 2018-145954, filed on 2 Aug. 2018, the disclosures of which are hereby incorporated herein by reference in their entireties.

TECHNICAL FIELD

The present invention relates to a sound collection apparatus, in particular a sound collection apparatus installed in a vehicle, including microphones used in beamforming that controls directivity of sound acquisition.

BACKGROUND ART

Beamforming for sound collection apparatuses installed in cars has been known as an existing technique for collecting only a desired sound without being affected by noises or interfering sounds (see NON-PATENT LITERATURE 1). The beamforming is designed to achieve greatest sensitivity to a direction of an expected target sound source to provide directivity so as not to pick up a noise or interfering sound as much as possible (see FIG. 1). Here, a highly focused directivity pattern is formed to pick up only the target sound as much as possible.

CITATION LIST

Non Patent Literature

[NON-PATENT LITERATURE 1] "Jidousya Nai no Onnsei Sousa ya Komyunikeisyonn wo Kaiteki ni Suru Syuuonn Gijyutsu wo Kaihatsu~Konekuteddo Ka Jidai ni Motomerareru Teichienn de Kouonnsitsu na Onnsei Syori wo Jitsugenn (Development of sound collection technique that allows for comfortable audio operations and communications inside a car~Realization of low-delay, high-quality audio processing desired in the connected car era ~)", [online], 2018, Nippon Telegraph and Telephone Corporation, May 24, 2018, Internet <URL:http://www.ntt.co.jp/news2018/1802/pdf/180219c.pdf>

SUMMARY OF THE INVENTION

Technical Problem

However, beamforming carried out inside a car may sometimes lead to a lower SNR because of intensive reflection by front glass and the like that inhibits pickup of a direct sound.

An object of the present invention is to provide a sound collection apparatus capable of collecting an audio sound with a higher SN rate than before through use of a reflected sound.

Means for Solving the Problem

To solve the problem described above, according to one aspect of the present invention, the sound collection apparatus is installed in a vehicle. Assuming that the vehicle includes a seat for a passenger to sit on, and a reflective structure that reflects a sound emitted by the passenger sitting in the seat, the sound collection apparatus includes a first microphone arranged at a position where a direct sound that is a sound emitted by the passenger is readily collected, and a second microphone arranged at a position where a reflected sound that is a sound emitted by the passenger and reflected by the reflective structure is readily collected.

To solve the problem described above, according to another aspect of the present invention, the sound collection apparatus is installed in a vehicle. Assuming that the vehicle includes a seat for a passenger to sit on, and a reflective structure that reflects a sound emitted by the passenger sitting in the seat, the sound collection apparatus includes a third microphone that collects a sound for carrying out signal processing of a reflected sound as a target sound with an aim to emphasize a sound emitted by the passenger. The reflected sound is a sound emitted by the passenger, reflected by the reflective structure, and collected by the third microphone.

Effects of the Invention

The present invention provides the effect whereby a sound can be collected with a higher SN rate than before.

DESCRIPTION OF EMBODIMENTS

Hereinafter, embodiments of the present invention will be described. Same symbols are given to constituent parts having the same function or to steps where the same process is performed in the drawings used in the following description to omit repetitive accounts. In the following description, the processing performed per each element of a vector or matrix shall be applicable to all the elements of that vector or matrix unless otherwise specified.

Feature of the First Embodiment

This embodiment features beamforming designed to achieve greatest sensitivity to a direction approximately in-between a direction of an expected target sound source and a direction of a reflected sound after the sound from the target sound is reflected by front glass or the like (hereinafter also referred to as incoming direction of a reflected sound). The directivity pattern has a width large enough to cover both of a direct sound and a reflected sound.

In a confined space such as a car, it is expected that a microphone could be located in close vicinity to a reflective structure such as front glass or side glass. In some cases, the sound reflected by glass in the car retains the feature of the sound emitted from the sound source more than the direct sound. Therefore, in some cases the SNR can be increased by handling a reflected sound as a target sound in place of or in addition to the direct sound. On an assumption that a reflected sound may be handled as such, this embodiment features improved arrangement and signal processing of an array of microphones that allow for accurate collection of direct sound and/or reflected sound. By picking up the reflected sound of the target sound, the SNR can be increased more. Here, a "target sound" may be rephrased as a "sound to be emphasized".

First Embodiment

Figure 2:
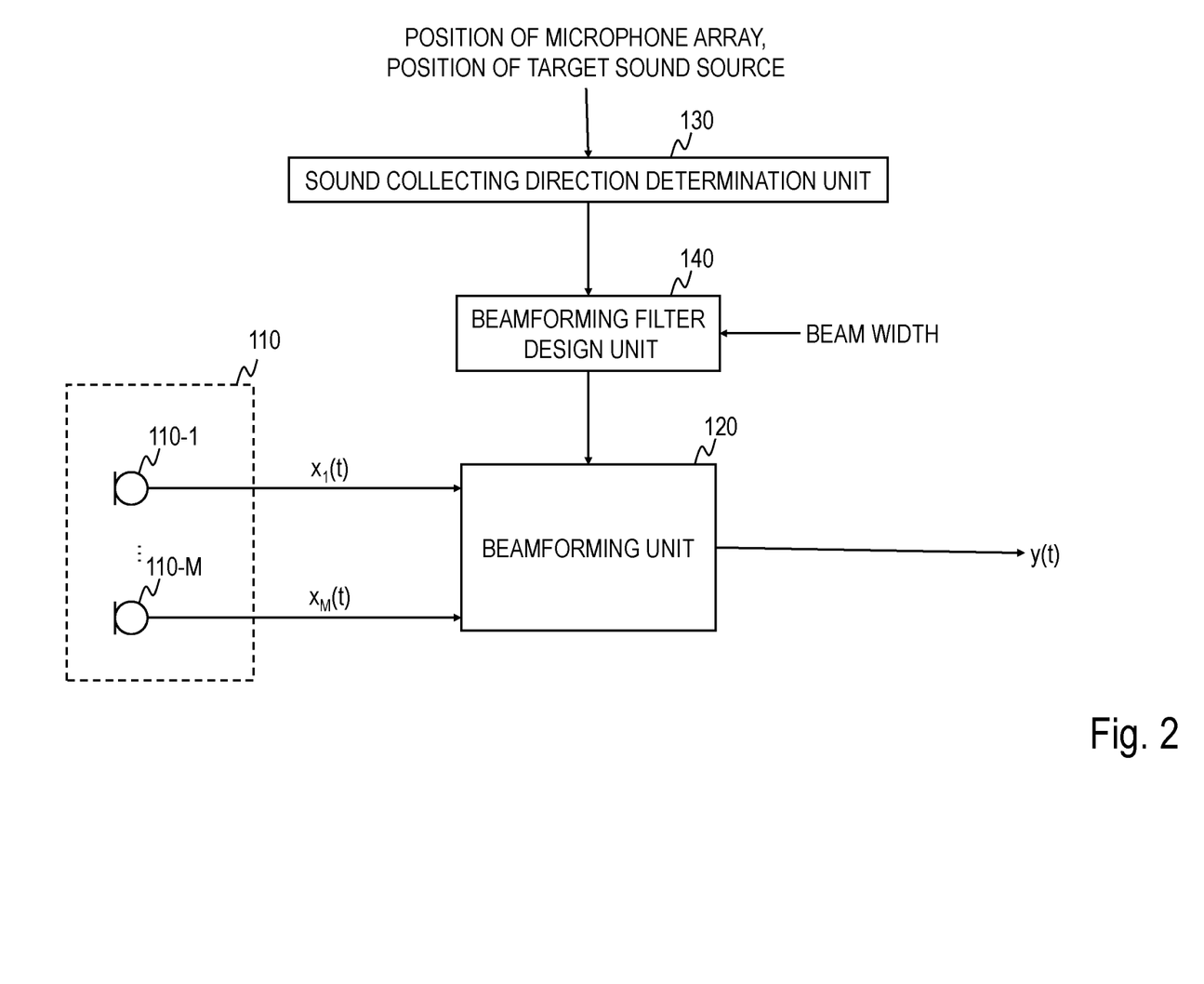
FIG. 2 is a functional block diagram of a sound collection apparatus according to a first embodiment.
Figure 3:
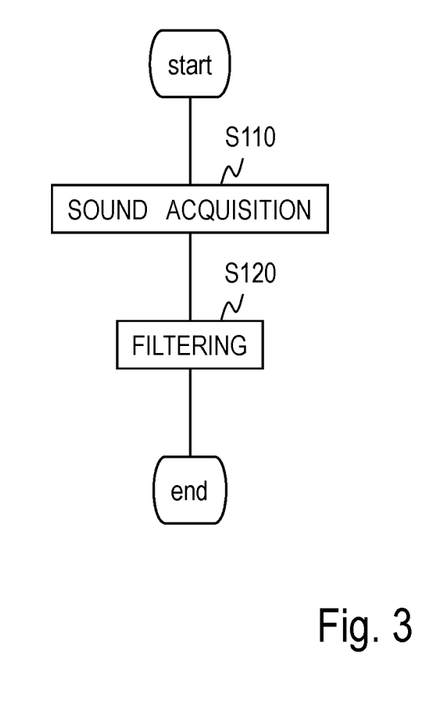
FIG. 3 is a diagram illustrating an example of a processing flow of the sound collection apparatus according to the first embodiment.

FIG. 2 is a functional block diagram, and FIG. 3 is a processing flow, of the sound collection apparatus according to the first embodiment.

The sound collection apparatus includes a microphone array 110 composed of M units of microphones 110-$m$, a beamforming unit 120, a sound collecting direction determination unit 130, and a beamforming filter design unit 140.

The sound collection apparatus is installed in a car. Here, it is assumed that the car includes a seat for a passenger to sit on, and a reflective structure that reflects a sound emitted by the passenger sitting in the seat. For example, the reflective structure may be (i) a structure that causes a sound emitted by the passenger to be reflected just once and collected by the microphone array 110; (ii) a structure that may sometimes cause a sound reflected by a reflective structure (reflected sound) to be collected by the microphone array 110 as a sound closer to the sound emitted by the passenger than the sound directly collected after emitted by the passenger (direct sound); or (iii) a structure that includes front glass, a seat, a ceiling, side glass, and so on.

The sound collection apparatus receives inputs of a direct sound that is the sound emitted by the passenger and a reflected sound that is the direct sound reflected by the reflective structure to acquire sound such as to achieve a high SN rate of the sound emitted by the passenger, and outputs acquired audio signals. The acquired audio signals can be used for conversations or audio operations. Note, "sound collection" herein refers to "collection of a sound", while "sound acquisition" refers to "acquisition of a sound as an electrical signal received with a microphone".

The sound collection apparatus (more specifically, the configuration including a beamforming unit, sound acquisition direction determination unit, and a beamforming filter design unit) is a special device configured by a known or dedicated computer including a central processing unit (CPU: Central Processing Unit), a main memory device (RAM: Random Access Memory) and so on, with a special program read therein. The sound collection apparatus executes various steps of processing under the control of the central processing unit. The data input to the sound collection apparatus and the data obtained in various steps of processing are stored in the main memory device, for example. The data stored in the main memory device is read out to the central processing unit as required and used for other processing. At least some parts of various processing units of the sound collection apparatus may be configured by hardware such as integrated circuits. Various memory units of the sound collection apparatus may be configured by a main memory device such as RAM (Random Access Memory), for example, or by middleware such as relational database or key-value store. Note, the sound collection apparatus need not necessarily include the various memory units inside. Memory units may each be configured by an auxiliary memory device such as a hard disk or an optical disc, or a semiconductor memory device such as a flash memory, and may be provided outside the sound collection apparatus.

Below, the units will each be described.

Microphone Array 110 Composed of M Units of Microphones 110-$m$

A microphone array 110 composed of M units of microphones 110-$m$ acquires sound by converting a direct sound that is a sound emitted by the passenger and a reflected sound that is the sound emitted by the passenger and reflected by a reflective structure into electrical signals (S110), and outputs M units of microphone signals $x_m(t)$. Here, M is any integer of 2 or more (m=1, 2, ..., M). At least one (110-$a$) of the M units of microphones 110-$m$ is arranged at a position where the direct sound is readily collected, while at least one microphone 110-$b$ is arranged at a position where the reflected sound is readily collected. The letters a and b each represent one of 1, 2, ..., M, and a≠b. The letter t represents an index indicative of time.

Beamforming Unit 120

The beamforming unit 120 receives inputs of M units of microphone signals $x_m(t)$, applies a filter to the microphone signals (S120), and outputs signals after the filtering, i.e., acquired audio signals y(t), as output values of the sound collection apparatus.

In this embodiment, the position of the microphone array and the position where the passenger emits a sound (which is the position of the target sound source, or the seat position where the passenger is seated) are specified beforehand. Therefore, prior to collection of a sound, the sound collecting direction determination unit 130 determines the direction to which the beam is to be directed (direction of directivity, i.e., direction to which the sensitivity is the greatest, to be referred to as sound collecting direction), and the beamforming filter design unit 140 calculates and obtains a filter. Applicable beamforming techniques include a delay-and-sum array, an adaptive array, and the like, but any other beamforming techniques may be used (Reference Literature 1).

(Reference Literature 1) "Dejitaru Onnsei•Oodio Gijyutsu (Mirai Netto Gijyutsu Siriizu) (Digital Audio Sound/Audio Technology (Mirai Net Technology Series))" by Nobuhiko Kitawaki, The Telecommunications Association, 1999, p. 170-182

The signal processing performed in this embodiment may be carried out in a time domain, or in a frequency domain. The domain can be selected in accordance with the beamforming technique to be used. For performing signal processing in a frequency domain, inputs of time domain signals $x_m(t)$ may be converted in a frequency domain conversion unit (not shown) into frequency domain signals $X_m$ (e.g., Fourier transform, etc.) and used, or frequency domain audio signals Y may be converted in a time domain conversion unit (not shown) into time domain audio signals y(t) (e.g., inverse Fourier transform, etc.) and output.

Sound Collecting Direction Determination Unit 130

The sound collecting direction determination unit 130 receives inputs of the position of the microphone array and the position of the target sound source, to determine the sound collecting direction, and outputs the same.

The position of the microphone array and the position of the target sound source may be suitably set so that a filter can be calculated correctly. For example, the center position of M units of microphones is set as the position of the microphone array, and the position where the passenger's mouth is expected to be when a person of an average sitting height sits on the seat is set as the position of the target sound source.

Figure 4:
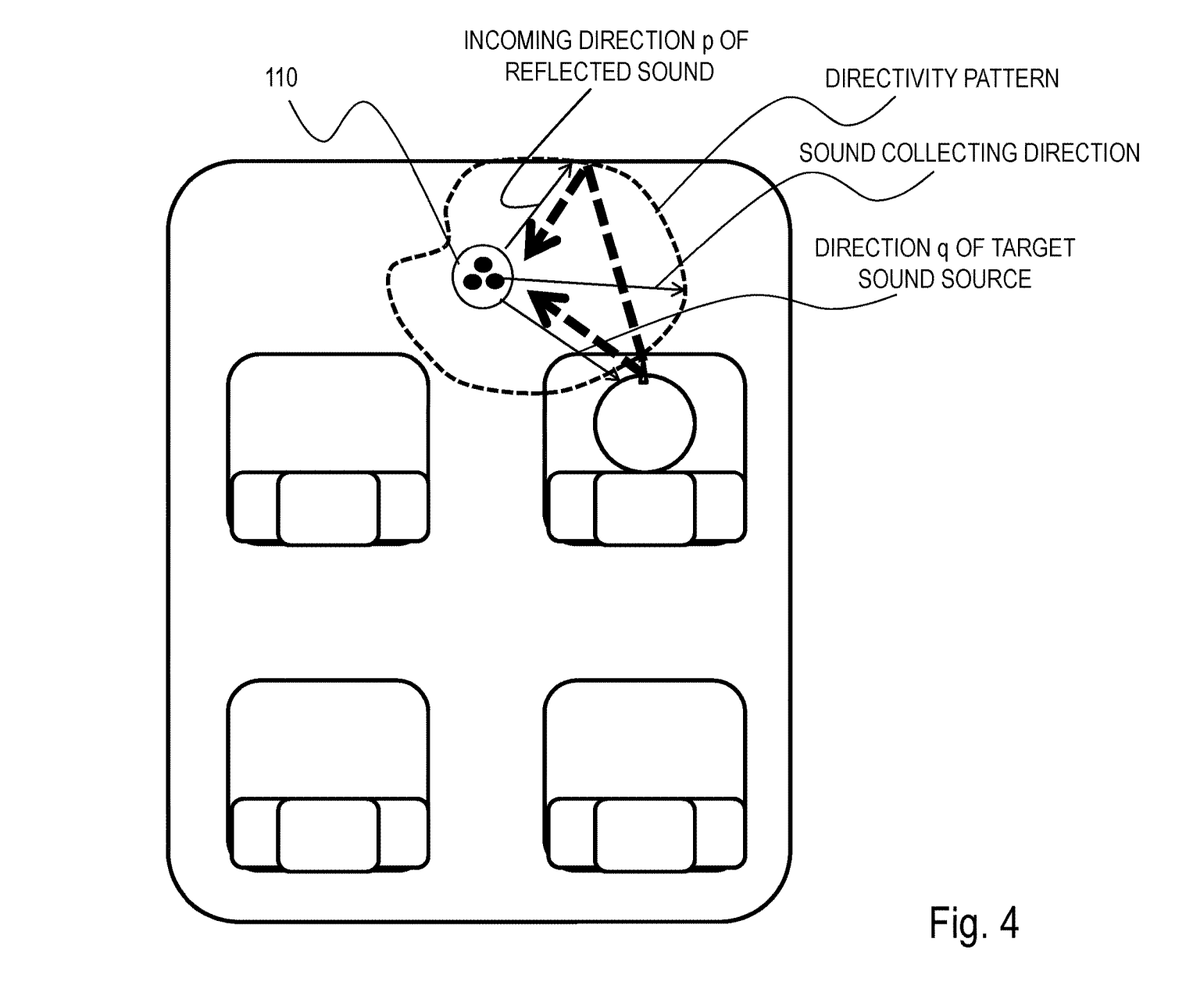
FIG. 4 is a diagram illustrating an example of a sound collecting direction of the sound collection apparatus according to the first embodiment.

The direction of the position of the target sound source as viewed from the position of the microphone array is also referred to as the direction q of the target sound source (see FIG. 4). The direction q of the target sound source can be specified from the position of the microphone array and the position of the target sound source.

It should be understood that the incoming direction p of the reflected sound is calculated beforehand from the position of the microphone array, the position of the target sound source, and the position and orientation etc. of the reflective structure, and can be specified from the position of the microphone array and the position of the target sound source. The sound collecting direction is determined from the direction of the target sound source and the incoming direction of the reflected sound as follows.

For example, the sound collecting direction is changed gradually from the direction of the target sound source to find a direction where the absolute value of a difference between the sound collecting direction and the incoming direction of the reflected sound is small. The sound collecting direction is then specified from a range in which (i) the sensitivity to the direction q of the target sound source is greater than a predetermined value, and (ii) the sensitivity to the incoming direction p of the reflected sound is greater than a predetermined value. For example, the sound collecting direction determination unit 130 determines a direction that is approximately in-between (e.g., mean) the direction of the target sound source and the incoming direction of the reflected sound. The beamforming filter design unit 140 sets the width of the directivity pattern to be large enough to cover both the direct sound and the reflected sound.

FIG. 4 is a diagram illustrating an example of a sound collecting direction in this embodiment.

Beamforming Filter Design Unit 140

The beamforming filter design unit 140 receives inputs of a sound collecting direction and a beam width, generates a filter for forming a beam that has directivity to the input sound collecting direction and has the input beam width, and outputs the same to the beamforming unit 120.

Effects

Figure 1:
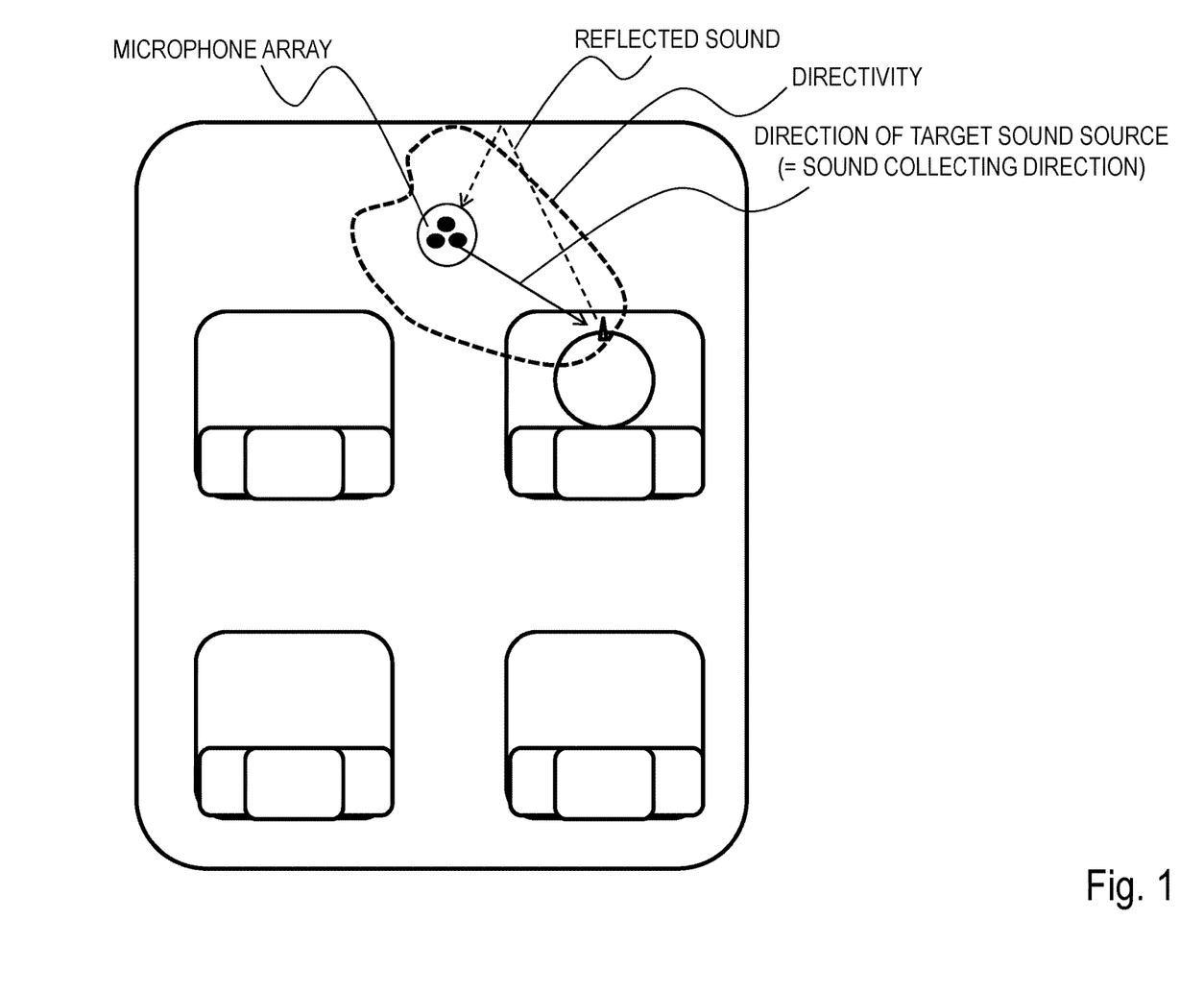
FIG. 1 is a diagram for describing an existing sound collection apparatus installed in a car.

The configuration above allows for collection of a sound with a higher SN rate than before. For example, only the voice emitted by a person sitting in the driver's seat as illustrated in FIG. 1 can be collected with a high SN rate. Not to mention, it is also possible to remove only the voice emitted by a person sitting in a predetermined seat, by handling the voice emitted by the person sitting in the predetermined seat as a noise.

Variation Example

While this embodiment assumes that the vehicle the sound collection apparatus is installed in is a car, the vehicle may be other vehicles. In short, any vehicle is applicable if it contains a seat for a passenger to sit on in a manner that allows for determination of where the sound emitted by the passenger comes from to some extent, and a reflective structure that reflects the sound emitted by the passenger. The vehicle may be a train or airplane, for example.

While the reflected sound from the reflective structure in front (for example, the front glass of a car) is a sound to be collected in the example of this embodiment, other reflected sounds such as, for example, the sounds reflected by a seat, a ceiling, side glass and the like as the reflective structure, may also be used. While this embodiment shows one example in which there is one reflected sound, two or more reflected sounds may be targeted as the sounds to be collected. Note, however, if there are too many reflected sounds, other sounds than the target sound will also be collected, which leads to a poorer SN rate. In short, one or more reflected sounds that contain a large proportion of the component of the target sound shall be the target sound to be collected in order to increase the SN rate of the target sound.

Figure 5:
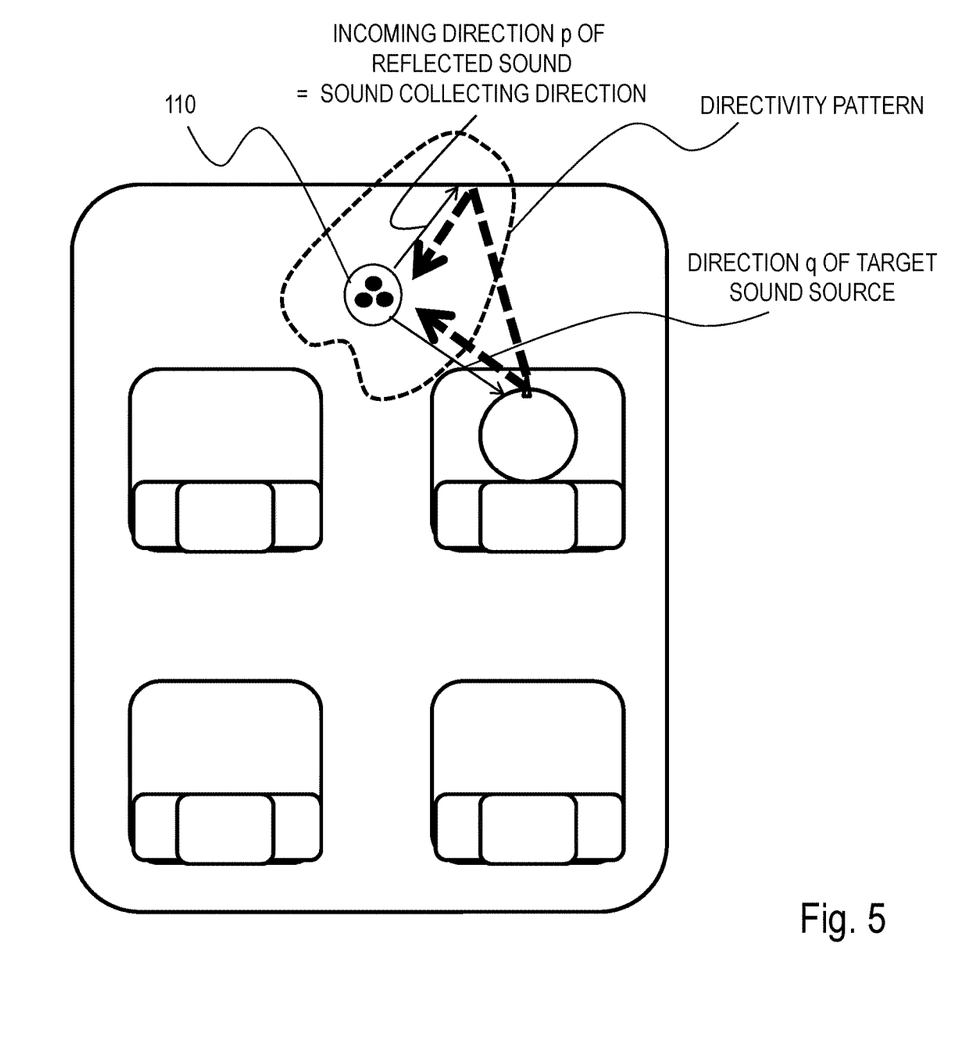
FIG. 5 is a diagram illustrating an example of a sound collecting direction of a sound collection apparatus according to a variation example of the first embodiment.

In this embodiment, at least one of the M units of microphones 110-$m$ collects sounds to carry out signal processing of a direct sound and a reflected sound as the targets of processing. Instead, the microphone may collect a sound to carry out signal processing of a reflected sound only as the target of processing. In this case, the sound collecting direction determination unit 130 receives inputs of the position of the microphone array and the position of the target sound source, to determine the incoming direction p of the reflected sound as the sound collecting direction, and outputs the same. FIG. 5 is a diagram illustrating an example of a sound collecting direction in this variation example. In some cases where a reflected sound is collected by the microphone array 110 as a sound closer to the sound emitted by the passenger than the direct sound, the SN rate can be increased with such a configuration, too.

Second Embodiment

Points different from the first embodiment will be mainly described.

In this embodiment, the direction of a target sound source and the incoming direction of a reflected sound are set as the sound collecting directions. In this case, two sound collecting directions are output.

Figure 6:
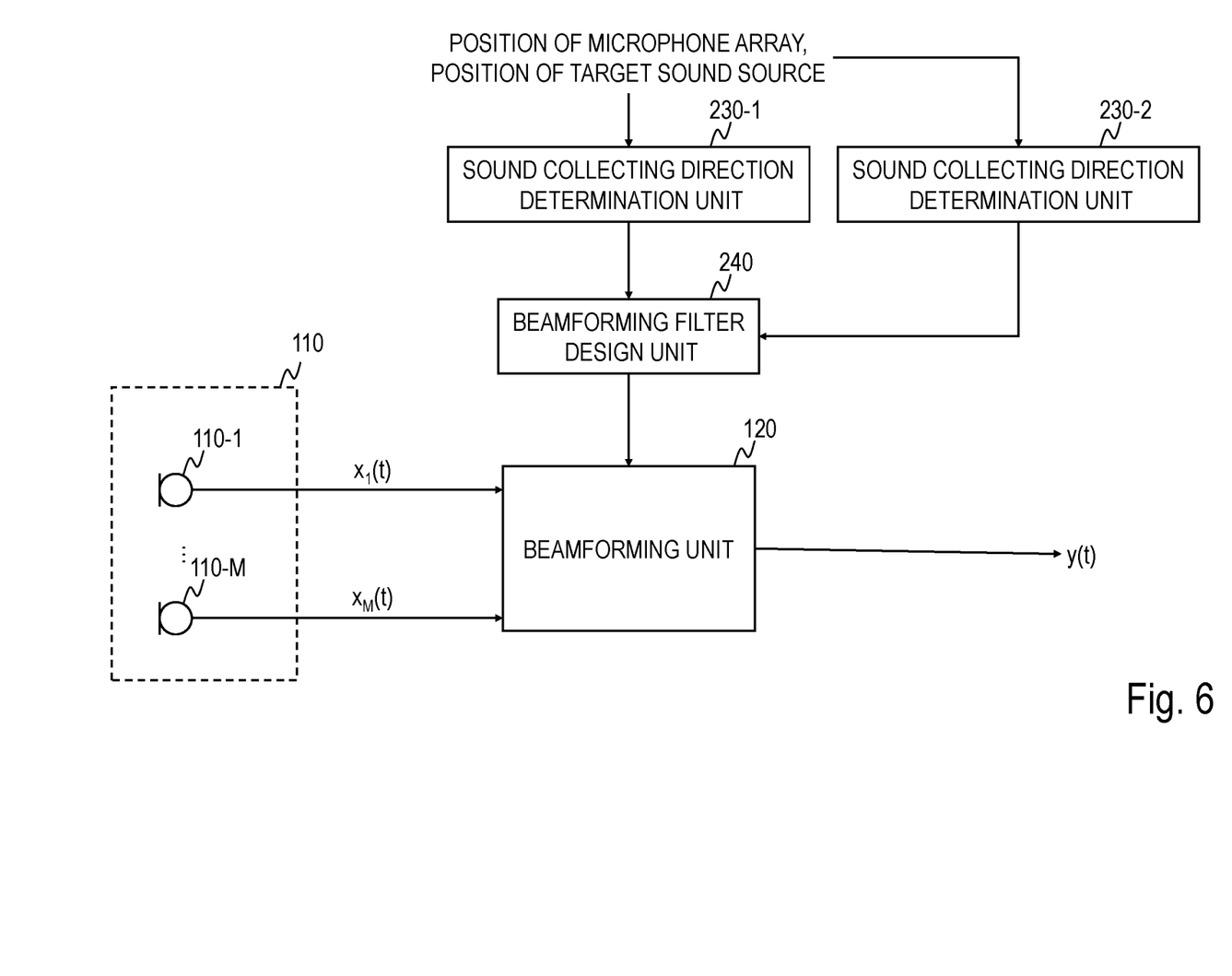
FIG. 6 is a functional block diagram of a sound collection apparatus according to a second embodiment.

FIG. 6 is a functional block diagram of a sound collection apparatus according to a second embodiment.

The sound collection apparatus includes a microphone array 110 composed of M units of microphones 110-$m$, a beamforming unit 120, sound collecting direction determination units 230-1 and 230-2, and a beamforming filter design unit 240.

Sound Collecting Direction Determination Units 230-1 and 230-2

The sound collecting direction determination unit 230-1 receives inputs of the position of the microphone array and the position of the target sound source, to determine the direction q of the target sound source as the sound collecting direction, and outputs the same.

The sound collecting direction determination unit 230-2 receives inputs of the position of the microphone array and the position of the target sound source, to determine the incoming direction p of the reflected sound as the sound collecting direction, and outputs the same. The direction q of the target sound source and the incoming direction p of the reflected sound are determined as has been described in the first embodiment.

Beamforming Filter Design Unit 240

The sound collecting direction determination unit 130 receives inputs of two sound collecting directions (the direction q of the target sound source and the incoming direction p of the reflected sound), generates a filter for forming a beam that has directivity to the two sound collecting directions, and outputs the same to the beamforming unit 120.

Figure 7:
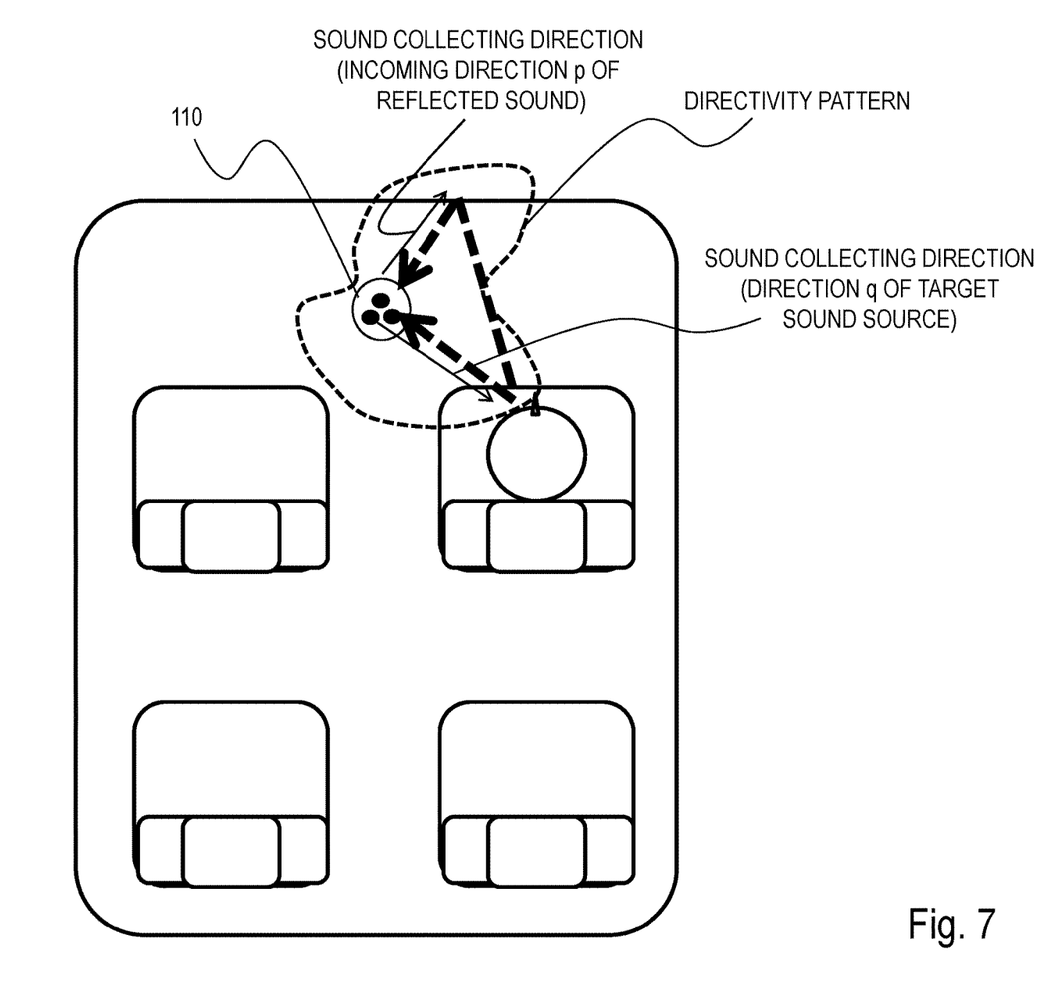
FIG. 7 is a diagram illustrating an example of a sound collecting direction of the sound collection apparatus according to the second embodiment.

FIG. 7 is a diagram illustrating an example of sound collecting directions in this embodiment.

Variation Example

In this embodiment, a filter for forming a beam that has directivity to two sound collecting directions is generated. As a variation example, two filters for forming a beam that has directivity to each of the two sound collecting directions may be generated. In this case, the two filters may be applied to the microphone signals in the beamforming unit 120 to obtain signals after the filtering with the two filters, and the mean of these signals may be output as audio signals.

Third Embodiment

Points different from the first embodiment will be mainly described.

In this embodiment, the beamforming is designed to achieve greatest sensitivity of directivity to a direction different from a direction of an expected target sound source so that the sensitivity to a direction of an expected interfering sound source is lowered.

For example, a sound emitted by a passenger that is different from the passenger whose sound is to be collected (passenger sitting in a different seat from the seat in which the passenger whose sound is to be collected is sitting) is assumed to be an interfering sound.

Figure 8:
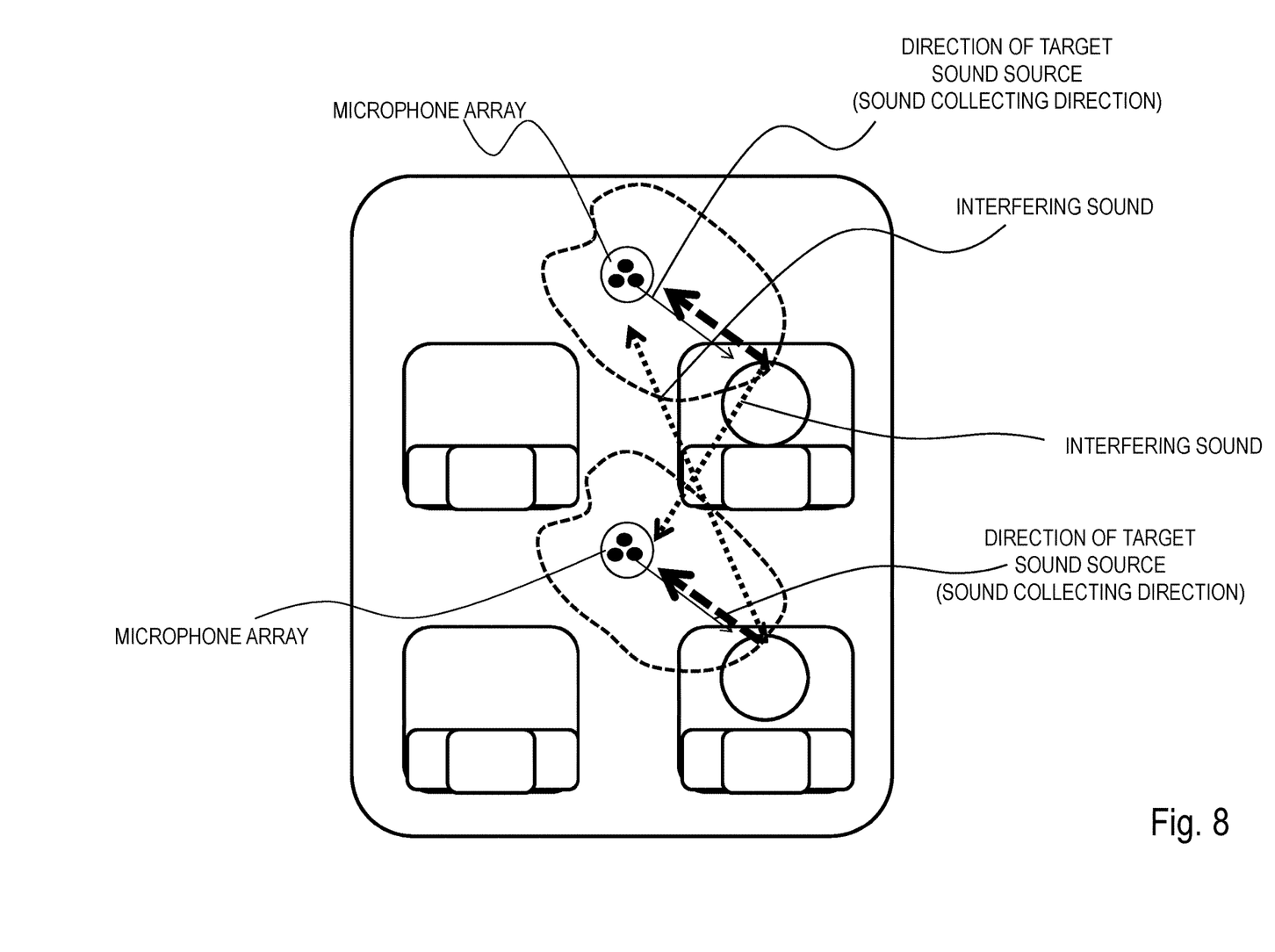
FIG. 8 is a diagram for describing an existing sound collection apparatus installed in a car.

In existing practice, a microphone array for collecting a sound emitted by a passenger sitting in a first row seat, and a microphone array for collecting a sound emitted by a passenger sitting in a second row seat are prepared, and the microphone arrays respectively form beams toward the passengers sitting in the seats of the first and second rows (see FIG. 8). In this case, the sound emitted by the passenger sitting in the second row seat is an interfering sound for the microphone array for collecting the sound emitted by the passenger sitting in the first row seat. Likewise, the sound emitted by the passenger sitting in the first row seat is an interfering sound for the microphone array for collecting the sound emitted by the passenger sitting in the second row seat.

In this embodiment, the beams are formed such as to reduce the sensitivity to the direction of the interfering sound source in order to minimize a reduction in SN rate by the interfering sound.

Sound Collecting Direction Determination Unit 330

Figure 9:
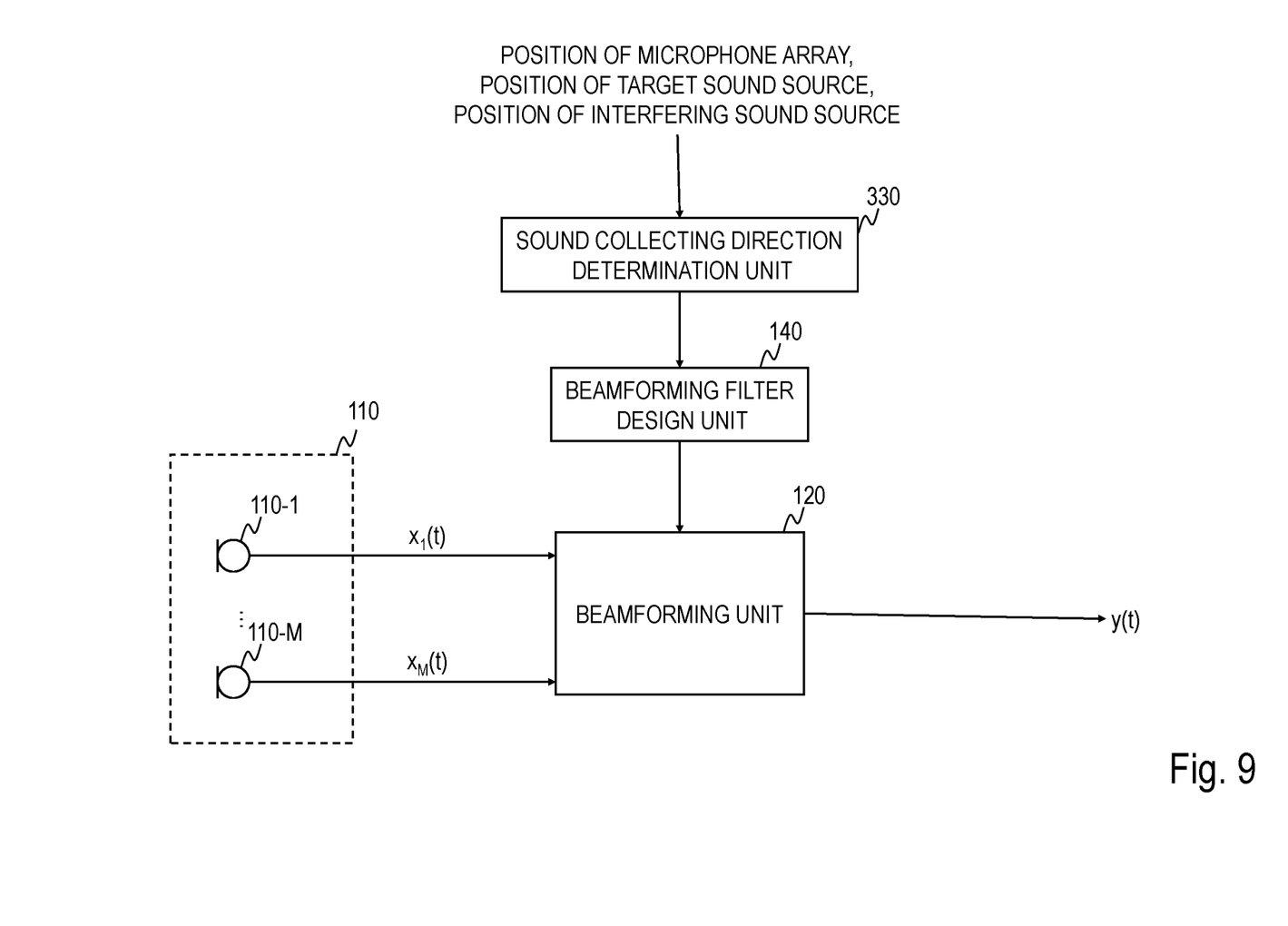
FIG. 9 is a functional block diagram of a sound collection apparatus according to a third embodiment.

The sound collecting direction determination unit 330 receives inputs of the position of the microphone array, the position of the target sound source, and the position of the interfering sound source, to determine sound collecting directions, and outputs the same (see FIG. 9). The position of the interfering sound source is, for example, the position of the mouth of the passenger expected to be sitting in a different seat from the seat in which the passenger whose sound is to be collected sits on.

The direction of the position of the interfering sound source as viewed from the position of the microphone array is also referred to as the direction r of an interfering sound source. The direction r of an interfering sound source can be specified from the position of the microphone array and the position of the interfering sound source.

The sound collecting direction determination unit 330 sets a direction different from the direction q of a target sound source as the sound collecting direction such that the sensitivity to the direction r of an interfering sound source is lowered. For example, the sound collecting direction determination unit 330 gradually changes the sound collecting direction from the direction q of the target sound source to find a direction where the absolute value of a difference between the sound collecting direction and the direction r of interfering sound source is large. The sound collecting direction is then specified from a range in which (i) the sensitivity to the direction q of the target sound source is larger than a predetermined value, and (ii) the sensitivity to the direction r of the interfering sound source is smaller than a predetermined value.

Figure 10:
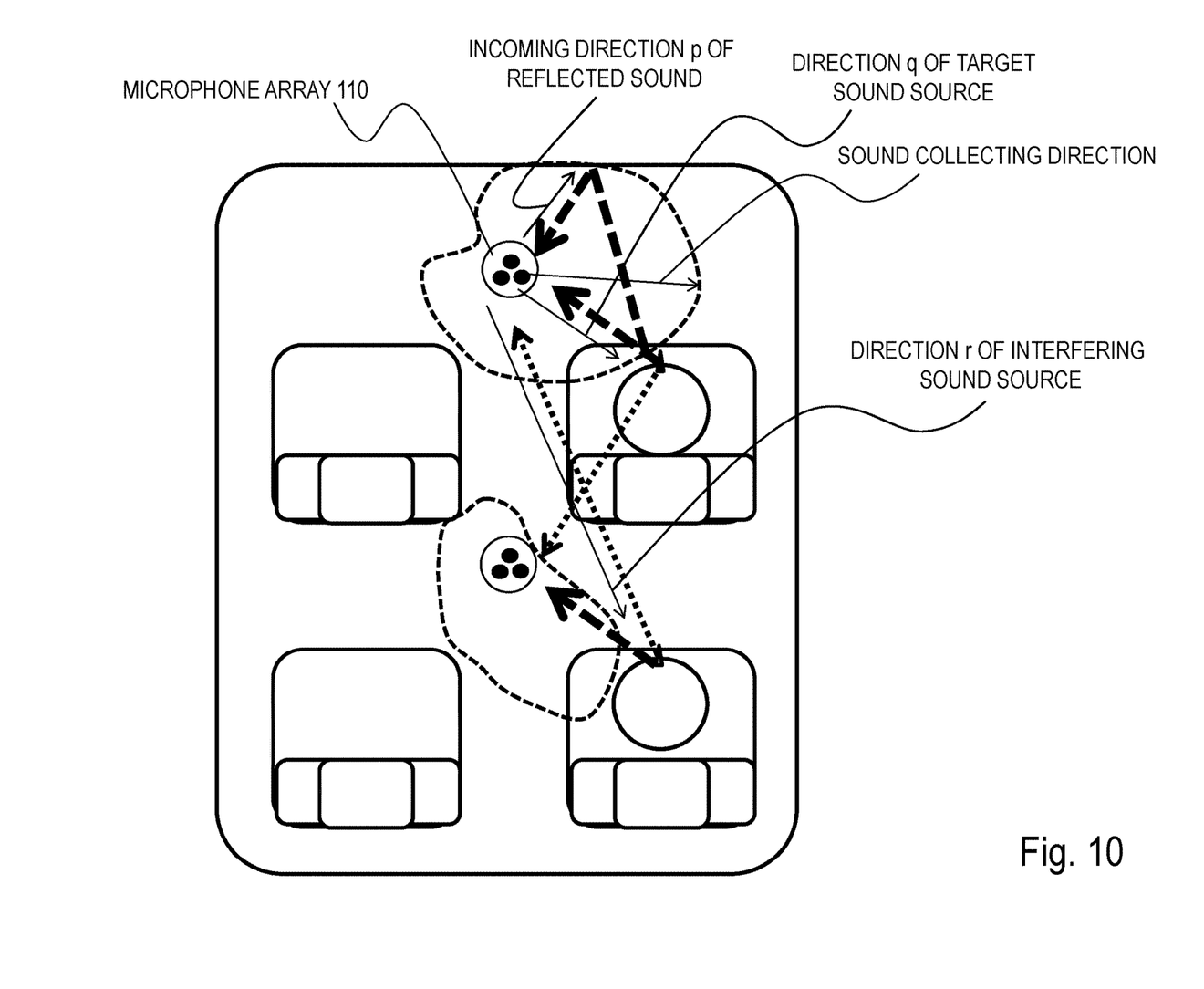
FIG. 10 is a diagram illustrating an example of a sound collecting direction of the sound collection apparatus according to the third embodiment.

FIG. 10 is a diagram illustrating an example of a sound collecting direction in this embodiment.

Variation Example

This embodiment may be combined with the first embodiment. In this case, the sound collecting direction determination unit 330 receives inputs of the position of the microphone array, the position of the target sound source, and the position of the interfering sound source, to determine the sound collecting direction, and outputs the same (see FIG. 9). For example, the sound collecting direction determination unit 330 gradually changes the sound collecting direction from the direction q of the target sound source to find a direction where the absolute value of a difference between the sound collecting direction and the incoming direction p of the reflected sound is small as well as the absolute value of a difference between the sound collecting direction and the direction r of the interfering sound source is large. The sound collecting direction is then specified from a range in which (i) the sensitivity to the direction q of the target sound source is larger than a predetermined value, (ii) the sensitivity to the incoming direction p of the reflected sound is larger than a predetermined value, and (iii) the sensitivity to the direction r of the interfering sound source is smaller than a predetermined value.

Fourth Embodiment

Points different from the second embodiment will be mainly described.

Since a highly focused directivity is hard to achieve in a low frequency band, the method of the first embodiment is used in a low frequency band, and the method of the second embodiment is used in a high frequency band. The beamforming filters are thus designed using different setting parameters for different frequency bands.

To benefit from the feature described above, the signal processing in this embodiment is carried out in the frequency domain. As described in the first embodiment, inputs of time domain signals $x_m(t)$ are converted in a frequency domain conversion unit (not shown) into frequency domain signals $X_m$ (e.g., Fourier transform, etc.) and used, and frequency domain audio signals Y are converted in a time domain conversion unit (not shown) into time domain audio signals y(t) (e.g., inverse Fourier transform, etc.) and output.

Figure 11:
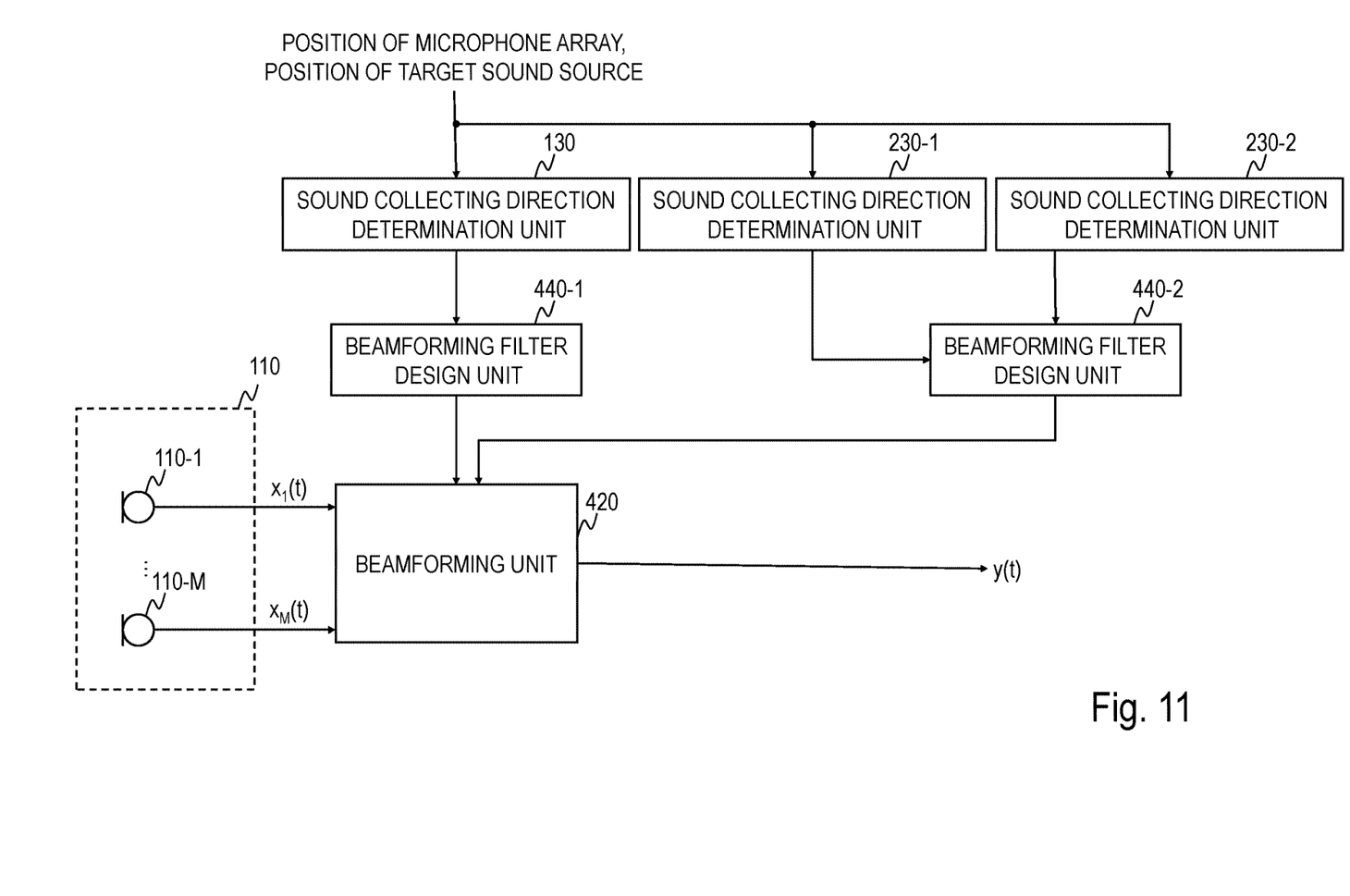
FIG. 11 is a functional block diagram of a sound collection apparatus according to a fourth embodiment.

FIG. 11 is a functional block diagram of a sound collection apparatus according to the fourth embodiment.

The sound collection apparatus includes a microphone array 110 composed of M units of microphones 110-$m$, a beamforming unit 420, sound collecting direction determination units 130, 230-1, and 230-2, and beamforming filter design units 440-1 and 440-2.

Beamforming Filter Design Unit 440-1 and 440-2

The beamforming filter design unit 440-1 receives an input of the sound collecting direction determined by the method of the first embodiment (e.g., direction approximately in-between the direction of the target sound source and the incoming direction of the reflected sound), generates a low-frequency band filter for forming a beam that has directivity to the input sound collecting direction, and outputs the same to the beamforming unit 420. In this embodiment, the beamforming filter design unit 440-1 generates filters only in a low frequency band, so that the beam width is expected to be large enough to cover both the direct sound and reflected sound. Therefore, it is not necessary to additionally input a beam width.

The beamforming filter design unit 440-2 receives inputs of the two sound collecting directions determined by the method of the second embodiment (e.g., the direction q of the target sound source and the incoming direction p of the reflected sound), generates a high-frequency band filter for forming a beam that has directivity to the two sound collecting directions, and outputs the same to the beamforming unit 420.

Beamforming Unit 420

The beamforming unit 420 applies the low-frequency band filter to the low-frequency band microphone signals $X_m(\omega_L)$ to obtain frequency domain audio signals $Y(\omega_L)$ after the filtering. Here, $\omega_L$ represents the frequency number 1, 2, . . . , Th, Th being the threshold that separates the low-frequency band from the high-frequency band.

The beamforming unit 420 applies the high-frequency band filter to the high-frequency band microphone signals $X_m(\omega_H)$ to obtain frequency domain audio signals $Y(\omega_H)$ after the filtering. Here, $\omega_H$ represents the frequency number Th+1, Th+2, . . . , $\Omega$, ($\Omega$ being the expected maximum value of frequency numbers) larger than the threshold Th.

The beamforming unit 420 converts the audio signals $Y(\omega_L)$ and $Y(\omega_H)$ into time domain audio signals y(t) and outputs the same.

Other Variation Examples

The present invention is not limited to the embodiments and variation examples described above. For example, various processing steps described above may not only be executed in chronological order in accordance with the description, but also be executed in parallel or individually in accordance with the processing capacity of the device executing the processing, or in accordance with necessity. Various other changes can be made as required without departing from the scope of the present invention.

Program and Recording Medium

Various processing functions in each of the devices described in the embodiments and variation examples above may be realized by a computer. In this case, a program describes the processing contents of the function each device should have. By executing this program on a computer, the various processing functions of each of the devices described above are realized on the computer.

The program that describes the processing contents may be recorded on a computer-readable recording medium. Any computer-readable recording medium may be used, such as, for example, a magnetic recording device, an optical disc, an opto-magnetic recording medium, a semiconductor memory, and so on.

This program may be distributed by selling, transferring, leasing, etc., a portable recording medium such as a DVD, CD-ROM and the like on which this program is recorded, for example. Moreover, this program may be distributed by storing the program in a recording device of a server computer, and by forwarding this program from the server computer to another computer via a network.

A computer that executes such a program may, for example, first temporarily store the program recorded on a portable recording medium or the program forwarded from a server computer, in a memory unit of its own. In executing the processing, this computer reads out the program stored in its own memory unit, and executes the processing in accordance with the read-out program. Moreover, in another embodiment, the computer may read out this program directly from a portable recording medium and execute the processing in accordance with the program. Further, every time a program is forwarded from a server computer to this computer, the processing in accordance with the received program may be executed consecutively. In an alternative configuration, instead of forwarding a program from a server computer to this computer, the processing described above may be executed by a service known as ASP (Application Service Provider) that realizes processing functions only through instruction of execution and acquisition of results. It should be understood that the program includes information to be provided for the processing by an electronic calculator based on the program (such as data having a characteristic to define processing of a computer, though not direct instructions to the computer).

Note, instead of configuring each device by executing a predetermined program on a computer, at least some of these processing contents may be realized by hardware.

The invention claimed is:

1. A sound collection apparatus to be installed in a vehicle, the vehicle including a seat for a passenger to sit on, and a reflective structure that reflects a sound emitted by the passenger sitting in the seat, the sound collection apparatus comprising:
a first microphone arranged at a position where a direct sound that is a sound emitted by the passenger is readily collected, and
a second microphone arranged at a position where a reflected sound that is emitted by the passenger and reflected by the reflective structure is readily collected, and a beamforming unit that applies a predetermined filter to microphone signals acquired with M units of microphones including the first microphone and the second microphone, where M is an integer of 2 or more, to obtain signals after filtering as audio signals, wherein the predetermined filter is one of:
(i) a filter with a directivity to a direction between a direction of a target sound source and an incoming direction of the reflected sound; or
(ii) a filter with a directivity to both the direction of the target sound source and the incoming direction of the reflected sound.

2. A sound collection apparatus to be installed in a vehicle, the vehicle including a seat for a passenger to sit on, and a reflective structure that reflects a sound emitted by the passenger sitting in the seat, the sound collection apparatus comprising:
a first microphone arranged at a position where a direct sound that is a sound emitted by the passenger is readily collected, and
a second microphone arranged at a position where a reflected sound that is emitted by the passenger and reflected by the reflective structure is readily collected, and
a beamforming unit that applies a first filter to microphone signals in a frequency range of a low frequency band acquired with M units of microphones including the first microphone and the second microphone, where M is an integer of 2 or more, wherein the low frequency band including frequencies equal or smaller than a predetermined threshold, and a high frequency band, including frequencies larger than the threshold, and applies a second filter to microphone signals in a frequency range of the high frequency band acquired with the M units of microphones, to obtain signals after filtering as output audio signals, wherein
the first filter is a filter with a directivity to a direction between a direction of a target sound source and an incoming direction of the reflected sound, and the second filter is a filter with a directivity to both the direction of the target sound source and the incoming direction of the reflected sound.

3. A sound collection apparatus to be installed in a vehicle, the vehicle including a seat for a passenger to sit on, and a reflective structure that reflects a sound emitted by the passenger sitting in the seat, the sound collection apparatus comprising:
a third microphone that collects a sound for carrying out signal processing of a reflected sound that is a sound emitted by the passenger and reflected by the reflective structure with an aim to emphasize a sound emitted by the passenger,
wherein the reflected sound is collected by the third microphone,
wherein the third microphone collects a sound for carrying out signal processing of a direct sound and the reflected sound as target sounds, and
wherein the direct sound is a sound emitted by the passenger and collected directly by the third microphone,
a beamforming unit that applies a predetermined filter to microphone signals acquired with M units of microphones including the third microphone, where M is an integer of 2 or more, to obtain signals after filtering as audio signals, wherein
the predetermined filter is one of:
(i) a filter with a directivity to a direction between a direction of a target sound source and an incoming direction of the reflected sound; or
(ii) a filter with a directivity to both the direction of the target sound source and the incoming direction of the reflected sound.

4. A sound collection apparatus to be installed in a vehicle, the vehicle including a seat for a passenger to sit on, and a reflective structure that reflects a sound emitted by the passenger sitting in the seat, the sound collection apparatus comprising:
a third microphone that collects a sound for carrying out signal processing of a reflected sound that is a sound emitted by the passenger and reflected by the reflective structure with an aim to emphasize a sound emitted by the passenger,
wherein the reflected sound is collected by the third microphone,
the third microphone collects a sound for carrying out signal processing of a direct sound and the reflected sound as target sounds, and
the direct sound is a sound emitted by the passenger and collected directly by the third microphone; and
a beamforming unit that applies a first filter to microphone signals in a frequency range of a low frequency band acquired with M units of microphones including the third microphone, where M is an integer of 2 or more, wherein the low frequency band including frequencies equal or smaller than a predetermined threshold, and a high frequency band, including frequencies larger than the threshold, and applies a second filter to microphone signals in a frequency range of the high frequency band acquired with the M units of microphones, to obtain signals after filtering as output audio signals, wherein
the first filter is a filter with a directivity to a direction between a direction of a target sound source and an incoming direction of the reflected sound, and the second filter is a filter with a directivity to both the direction of the target sound source and the incoming direction of the reflected sound.

* * * * *